(12) United States Patent
Wang

(10) Patent No.: US 10,159,017 B2
(45) Date of Patent: Dec. 18, 2018

(54) DUAL-CARD AND DUAL-SYSTEM TERMINAL, INCOMING CALL PROCESSING METHOD AND APPARATUS THEREOF, AND STORAGE MEDIUM THEREOF

(71) Applicant: CloudMinds (Shenzhen) Robotics Systems Co., Ltd., Beijing (CN)

(72) Inventor: Sen Wang, Beijing (CN)

(73) Assignee: CloudMinds (Shenzhen) Robotics Systems Co., Ltd., Beijing (CN)

( * ) Notice: Subject to any disclaimer, the term of this patent is extended or adjusted under 35 U.S.C. 154(b) by 0 days.

(21) Appl. No.: 15/319,498

(22) PCT Filed: Jul. 15, 2016

(86) PCT No.: PCT/CN2016/090153
§ 371 (c)(1),
(2) Date: Dec. 16, 2016

(87) PCT Pub. No.: WO2017/008762
PCT Pub. Date: Jan. 19, 2017

(65) Prior Publication Data
US 2018/0167853 A1    Jun. 14, 2018

(30) Foreign Application Priority Data

Jul. 16, 2015    (CN) .......................... 2015 1 0419172

(51) Int. Cl.
*H04B 1/38* (2015.01)
*H04W 36/00* (2009.01)
(Continued)

(52) U.S. Cl.
CPC .... *H04W 36/0027* (2013.01); *G06F 3/04886* (2013.01); *H04M 1/72519* (2013.01);
(Continued)

(58) Field of Classification Search
CPC combination set(s) only.
See application file for complete search history.

(56) References Cited

U.S. PATENT DOCUMENTS

2009/0258670 A1    10/2009 Juang

FOREIGN PATENT DOCUMENTS

| CN | 104123113 A | 10/2014 |
| CN | 104184899 A | 12/2014 |

(Continued)

OTHER PUBLICATIONS

Supplementary European Search Report in European application No. 16809277.3, dated Aug. 18, 2017.
(Continued)

*Primary Examiner* — Xin Jia
(74) *Attorney, Agent, or Firm* — Syncoda LLC; Feng Ma; Junjie Feng

(57) ABSTRACT

Disclosed is an incoming call processing method for a dual-card and dual-system terminal. A first operating system receives an incoming call of a first SIM card; a second operating system triggers an event to notify the first operating system of an incoming call of a second SIM card upon receiving the same; the first or second operating system partitions a display screen into first and second display regions; and the first operating system displays an operating interface of the SIM card corresponding to the first operating system in the first display region, and triggers an event to notify the second operating system of display in the second display region; or the second operating system displays an operating interface of the SIM card corresponding to the second operating system in the second display region, and triggers an event to notify the first operating system of display in the first display region.

17 Claims, 8 Drawing Sheets

(51) Int. Cl.
*H04M 1/725* (2006.01)
*H04M 19/04* (2006.01)
*G06F 3/0488* (2013.01)
*H04M 3/38* (2006.01)

(52) U.S. Cl.
CPC ........... *H04M 3/387* (2013.01); *H04M 19/04* (2013.01); *H04M 2250/66* (2013.01)

(56) References Cited

FOREIGN PATENT DOCUMENTS

| | | |
|---|---|---|
| CN | 104267894 A | 1/2015 |
| CN | 104507181 A | 4/2015 |
| CN | 104765623 A | 7/2015 |
| CN | 105072257 A | 11/2015 |
| EP | 2528310 A2 | 11/2012 |

OTHER PUBLICATIONS

English Translation of the Written Opinion of the International Search Authority in international application No. PCT/CN2016/090153, dated Sep. 21, 2016.
International Search Report in international application No. PCT/CN2016/090153, dated Sep. 21, 2016.

DUAL-CARD AND DUAL-SYSTEM TERMINAL, INCOMING CALL PROCESSING METHOD AND APPARATUS THEREOF, AND STORAGE MEDIUM THEREOF

TECHNICAL FIELD

The present invention relates to the technical field of terminals, and in particular, relates to a dual-card and dual-system terminal, an incoming call processing method and apparatus thereof, and a storage medium thereof.

BACKGROUND

At present, dual-card terminals available in the market are mostly dual-card but single-operating system terminals. During use of such terminals, with respect to incoming calls, there are commonly the following cases: one SIM card has an incoming call, both of the two SIM cards have an incoming call, and the other SIM card has an incoming call while one SIM card is in a call. With respect to users, the address book and incoming call information of a dual-card and single-operating system terminal are shared between the SIM cards. Therefore, these incoming calls may be processed in the same user interface.

Some dual-card and dual-operating system terminal products are also available in the market. With respect to such a terminal, when both of the two SIM cards have an incoming call, the screen of the terminal only displays the incoming call information of one SIM card; and when the other SIM card has an incoming call while one SIM card is in the call, the incoming call of the other SIM card is automatically shielded. This manner is similar to a dual-card single-standby and single-call terminal, and the incoming call of only one SIM card may be processed at the same moment.

Besides, still some other dual-card and dual-operating system terminals are also available in the market. Although these terminals may process the incoming calls of the two SIM cards in the same user interface, in practice, the address book and the call records of the two operating systems are still shared, which is similar to implementation of the dual-card and single-operating system in the related art. In this manner, although two incoming calls may be processed in the screen, data security between the two operating systems is damaged, thereby causing leakage of user data.

The related art is defective in that:

The conventional dual-card and dual-system terminal fails to ensure data security between two operating systems while simultaneously processing incoming calls from two SIM cards.

SUMMARY

Embodiments of the present invention provide an incoming call processing method for a dual-card and dual-system terminal, an incoming call processing apparatus for a dual-card and dual-system terminal and a storage medium thereof, to solve the technical problem in the related art that a dual-card and dual-system terminal fails to ensure data security between two operating systems while simultaneously processing incoming calls from two SIM cards.

In one aspect, the embodiments of the present invention provide an incoming call processing method for a dual-card and dual-system terminal, including the following steps:

receiving, by a first operating system, an incoming call of a first subscriber identity module (SIM) card;

triggering, by a second operating system receiving an incoming call of a second SIM card, an event to notify the first operating system of the incoming call of the second SIM card;

partitioning, by the first operating system, a display screen into a first display region and a second display region according to a predetermined display manner, displaying an operating interface of the SIM card corresponding to the first operating system in the first display region, and triggering an event to notify the second operating system of display in the second display region; wherein the second operating system displays an incoming call interface of the second SIM card in the second display region; or partitioning, by the second operating system, a display screen into a first display region and a second display region according to a predetermined display manner, displaying an operating interface of the SIM card corresponding to the second operating system in the second display region, and triggering an event to notify the first operating system of display in the first display region; wherein the first operating system displays an incoming call interface of the first SIM card in the first display region.

In another aspect, the embodiments of the present invention provide an incoming call processing apparatus for a dual-card and dual-system terminal, including:

a receiving module, configured to receive, in a first operating system, an incoming call of a first user identity module (SIM) card, and receive, in a second operating system, an incoming call of a second SIM card;

an event triggering module, configured to trigger, in the second operating system, an event to notify the first operating system of the incoming call of the second SIM card;

a screen partitioning module, configured to partition, in the first operating system, a display screen into a first display region and a second display region according to a predetermined display manner; and a displaying module, configured to display, in the first operating system, an operation interface of the first SIM card in the first display region;

wherein the event triggering module is further configured to trigger an event to notify the second operating system of display in the second display region; and the displaying module is further configured to display, in the second operating system, an incoming call interface of the second SIM card in the second display region.

In another aspect, the embodiments of the present invention further provide a storage medium, wherein the storage medium stores instructions configured to perform the above method.

In another aspect, the embodiments of the present invention further provide a dual-card and dual-system terminal, including the above storage medium, wherein the processor is configured to execute the instructions stored in the storage medium.

In another aspect, the embodiments of the present invention provide an incoming call processing method for a dual-card and dual-system terminal, including:

detecting whether one operating system that the terminal uses has an incoming call or the other operating system has an incoming call; wherein the detecting whether the other operating system has an incoming call includes: determining that the other operating system has an incoming call when an incoming call notification message sent by the other operating system is received; and when both of the two operating systems have an incoming call, partitioning a display screen into a first display region and a second display region according to a predetermined display manner, displaying, in the first display region, the incoming call of the operating system that the terminal uses, and sending a display notification message to the other operating system, such that the other operating system displays an incoming call of the other operating system in the second display region.

In another aspect, the embodiments of the present invention further provide an incoming call processing apparatus, including a detecting module, a screen partitioning module and a displaying module; wherein the detecting module is configured to detect whether one operating system that the terminal uses has an incoming call or the other operating system has an incoming call; wherein the detecting whether the other operating system has an incoming call includes: determining that the other operating system has an incoming call when an incoming call notification message sent by the other operating system is received;

the screen partitioning module is configured to, when both of the two operating systems have an incoming call, partition a display screen into a first display region and a second display region according to a predetermined display manner, and send a display notification message to the other operating system, such that the other operating system displays an incoming call of the other operating system in the second display region; and the displaying module is configured to display, in the first display region, the incoming call of the operating system that the terminal uses.

In another aspect, the embodiments of the present invention further provide a storage medium, wherein the storage medium stores instructions configured to perform the above method.

In another aspect, the embodiments of the present invention further provide a dual-card and dual-system terminal, including the above storage medium, wherein the processor is configured to execute the instructions stored in the storage medium.

The following beneficial effects are achieved:

With the dual-card and dual-system terminal and the incoming call processing method, the incoming call processing apparatus and the storage medium thereof according to the embodiments of the present invention, the incoming calls of the two SIM cards are separately processed by two corresponding operating systems, interfaces of the two SIM cards are separately displayed in two display regions of the same screen, and the interfaces displayed by the operating systems corresponding to the two SIM cards are subjected to no mutual interference. In addition, in the embodiments of the present invention, two operating systems interact with each other by means of triggering an event, and thus data sharing or interaction within the operating systems are not involved. Therefore, data security between the two operating systems may be ensured while simultaneously processing the incoming calls of the two SIM cards.

BRIEF DESCRIPTION OF THE DRAWINGS

Specific embodiments of the present invention are described hereinafter in detail with reference to the accompanying drawings.

DETAILED DESCRIPTION

To make the technical solutions and advantages of the present invention clearer and more understandable, exemplary embodiments of the present invention are described in detail hereinafter with reference to the accompanying drawings. Apparently, the described embodiments are merely a part of embodiments of the present invention, instead of all the embodiments of the present invention. It should be noted that in cases of no conflict, the embodiments and features in the embodiments of the present invention may be combined together.

With respect to the defect in the related art, the embodiments of the present invention provides an incoming call processing method for a dual-card and dual-system terminal and an incoming call processing apparatus for a dual-card and dual-system terminal, which are described hereinafter.

Embodiment 1

Figure 1:
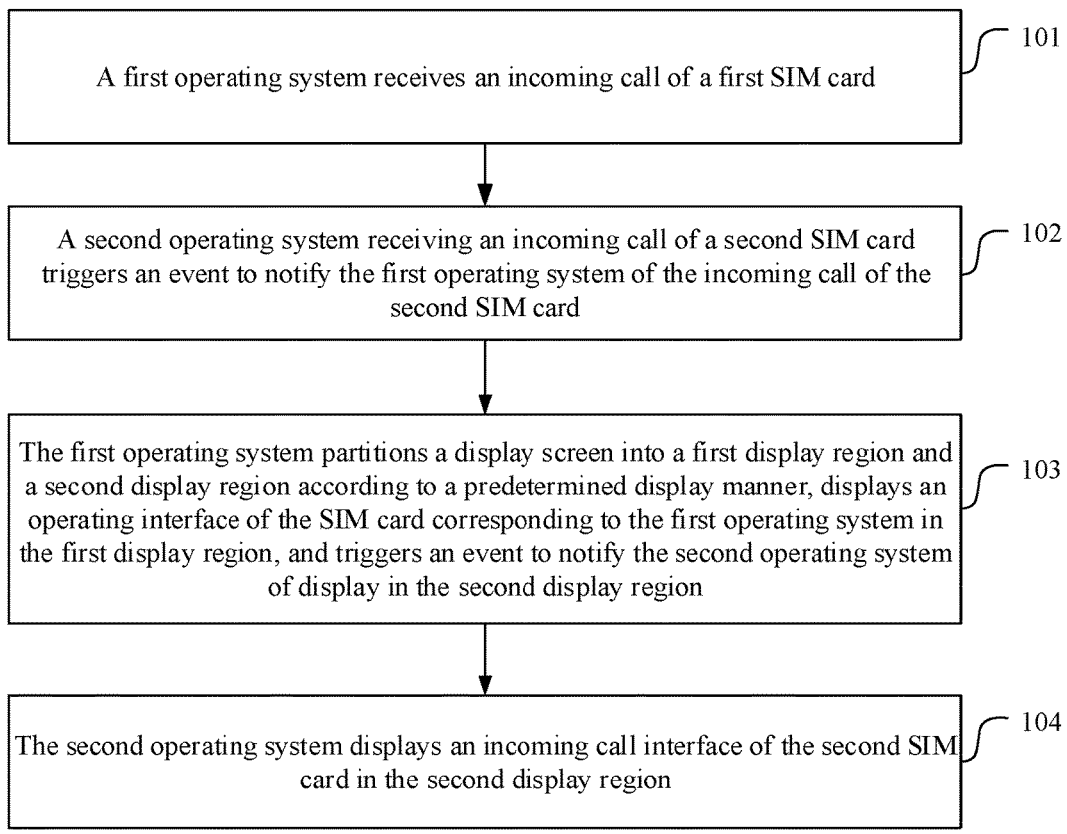
FIG. 1 is a schematic flowchart of an incoming call processing method for a dual-card and dual-system terminal according to Embodiment 1 of the present invention.

FIG. 1 is a schematic flowchart of an incoming call processing method for a dual-card and dual-system terminal according to Embodiment 1 of the present invention. As illustrated in FIG. 1, the incoming call processing method for a dual-card and dual-system terminal may include the following steps.

Step 101: A first operating system receives an incoming call of a first subscriber identity module (SIM) card.

Step 102: A second operating system receiving an incoming call of a second SIM card triggers an event to notify the first operating system of the incoming call of the second SIM card.

Step 103: The first operating system partitions a display screen into a first display region and a second display region according to a predetermined display manner, displays an operating interface of the SIM card corresponding to the first operating system in the first display region, and triggers an event to notify the second operating system of display in the second display region.

Specifically, the first operating system may partition the display screen into the first display region and the second display region according to a predetermined display manner, display a called interface of the SIM card corresponding to the first operating system in the first display region, and trigger the event to notify the second operating system to display a called interface of the second SIM card in the second display region; or the second operating system may partition the display screen into the first display region and the second display region according to the predetermined display manner, display a called interface of the SIM card corresponding to the second operating system in the second display region, and trigger the event to notify the first operating system to display a called interface of the first SIM card in the first display region.

Step 104: The second operating system displays an incoming call interface of the second SIM card in the second display region.

Specifically, when the first operating system partitions the display screen, the first operating system notifies the second operating system of display in the second display region, and the second operating system displays the incoming call interface of the second SIM card in the second display region upon receiving the notification; and when the second operating system partitions the display screen, the second operating system notifies the first operating system of display in the first display region, and the first operating system displays the incoming call interface of the first operating system in the first display region upon receiving the notification. In this embodiment of the present invention, specific positions corresponding to the first display region and the second display region are not limited, the incoming call interface displaying the SIM card (the first SIM card) of the first operating system is referred to as a first display interface, and the incoming call interface displaying the SIM card (the second SIM card) of the second operating system is referred to as a second display interface. In this embodiment of the present invention, the first SIM card may be bound to the first operating system, and the second SIM card may be bound to the second operating system. That is, the first operating system is responsible for performing all the operations related to the first SIM card, and the second operating system is responsible for performing all the operations related to the second SIM card. For example, the address book, call records, short messages, multimedia short messages and the like of the first SIM card are all stored in the first operating system, and such operations as displaying caller ID, getting through calls, rejecting calls and hang-up calls, or such operations as editing short messages and sending short messages of the first SIM cards are all performed by the first operating system; and the address book, call records, short messages, multimedia short messages and the like of the second SIM card are all stored in the second operating system, and such operations as displaying caller ID, getting through calls, rejecting calls and hang-up calls, or such operations as editing short messages and sending short messages of the first SIM cards are all performed by the second operating system. Operations of the two SIM cards are separately performed by the two operating systems corresponding to the two SIM cards, and no mutual interference is caused between the two operating systems.

The second operating system may notify, by means of triggering an event, the first operating system of the incoming call of the second SIM card. In practice, a system event may be predefined, and an event processing procedure may be triggered in the advent of the event (upon receipt of an incoming call) to send a notification to the first operating system. Event triggering may be specifically implemented according to the related art. A person skilled in the art only needs to make simple development and design. The specific programming process is not described any further in the present invention. Since the second operating system only triggers an event to give a notification to the first operating system and no data (for example, address book, call records and the like) is involved, data security may be ensured between two operating systems.

The predetermined display manner may be predefined by the user. In this embodiment of the present invention, the predetermined display manner may be top and bottom split-screen display or left and right split-screen display. The area of the first display region is the same as that of the second display region, or the areas of the first display region and the second display region may be defined to be different according to priority of the SIM cards. The specific distribution and area of the two display regions are not limited in the present invention.

In this embodiment of the present invention, the screen partitioning may be implemented according to the screen partitioning technology in the related art, for example, by using the screen partitioning function provided by an activity manager equipped in the Android system. Specifically, the current system is controlled to achieve half-screen display by using a frame buffer of the Android system, or by using an application. Screen partitioning may be implemented by a person skilled in the art by means of making corresponding development and design, which is not described any further in the present invention.

In this embodiment of the present invention, the operation interface may include an incoming call interface (that is, an interface displaying an incoming call message), a call interface (that is, an interface displaying an undergoing call), a missed call interface (that is, an interface displaying a missed call message). When the second operating system receives an incoming call of the second SIM card, the first SIM card may be in a state where an incoming call is not yet answered (an incoming call interface), or may be in a state where an incoming call is answered and the call is undergoing (a call interface), or may be in a state where an incoming call is rejected by the user or rejected due to timeout (a missed call interface).

The two SIM cards may simultaneously have an incoming call, or the first SIM card has an incoming call and then the second SIM card has an incoming call. That is, in this embodiment of the present invention, reception of the incoming call of the first SIM card and the incoming call of the second SIM card may involve three cases:

The first case is that when the two SIM cards are both in an idle state, both the two cards have an incoming call. That is, at the same time, an incoming call of the first SIM card and an incoming call of the second SIM card are received.

The second case is that when one SIM card is in a call state, the other SIM card has an incoming call. That is, after an incoming call of the first SIM card is got through, an incoming call of the second SIM card is received.

The third case is that an incoming call of one SIM card is rejected and the other SIM card has an incoming call. For example, when an incoming call of the first SIM card is not answered and then rejected due to timeout, the second SIM card has an incoming call.

If the two cards have an incoming call at the same time, the first display region of the display screen may display the calling number, the called number, the answer key, the reject key and the like of the first SIM card, and the second display region of the display screen may display the calling number, the called number, the answer key, the reject key and the like of the second SIM card.

If the first SIM card is in a call and the second SIM card has an incoming call, the first display region of the display screen may display the calling number of the first SIM card, the called number of the first SIM card, the state of "being in the call" of the first SIM card, the call duration and the like of the first SIM card, and the second display region may display the calling number of the second SIM card, the called number of the second SIM card, answering the incoming call of the second SIM card while maintaining the call of the first SIM card, hanging up the call of the first SIM card and answering the incoming call of the second SIM card, rejecting the incoming call of the second SIM card and the like.

If the incoming call of the first SIM card is rejected and the second SIM card has an incoming call, the first display region of the display screen may display the calling number of the first SIM card, the called number of the first SIM card, the state of "being not answered" and the like of the first SIM card, and the second display region may display the calling number, the called number, the answer key, the reject key and the like of the second SIM card.

Upon partitioning the display screen and displaying in half screen the information of the first operating system (the operation interface of the first SIM card), the first operating system may notify, by triggering an event, the second operating system that display may be implemented in the second display region; and upon receiving the notification, the second operating system may display the incoming call interface of the second SIM card in the second display region.

In practice, the incoming call interface of the first SIM card may display my number (that is, the called number), the calling number, contact information corresponding to the calling number (for example, name of the contact) and the like of the first SIM card; and the incoming call interface of the second SIM card may display my number (that is the called number), the calling number, contact information corresponding to the calling number (for example, name of the contact) and the like of the second SIM card.

In this embodiment of the present invention, since the incoming calls from the two SIM cards are separately processed by two corresponding operating systems, an event only needs to be triggered for interaction between the two operating systems, with no need of sharing the address books, call records and the like information, which ensures data security between the two operating systems. In addition, in this embodiment of the present invention, the incoming call messages from the two SIM cards may be separately displayed in two display regions of the same screen, and the interfaces displays in the operating systems corresponding to the two SIM cards are subjected to no mutual interference, and thus the user may selectively answer or reject the incoming call of either of the two SIM cards, thereby facilitating usage of the user.

In practice, the operation interface of the first SIM card is an incoming call interface, and after the second operating system displays the incoming call interface of the second SIM card in the second display region, the method may further include:

when any operating system receives a request for getting through the incoming call of the SIM card corresponding to the operating system, getting through the incoming call of the SIM card corresponding to the operating system, and displaying a call interface of the SIM card corresponding to the operating system in a display region of the operating system.

In this embodiment of the present invention, after the incoming call interface of the first SIM card is displayed in the first display region, and the incoming call interface of the second SIM card is displayed in the second display region, the user may selectively answer the incoming call of the first SIM card or the incoming call of the second SIM card. When receiving a request sent by the user for getting through the incoming call of the first SIM card, the first operating system may get through the incoming call of the first SIM card, and then display the call interface of the first SIM card in the first display region; or when receiving a request sent by the user for getting through the incoming call of the second SIM card, the second operating system may get through the incoming call of the second SIM card, and then display the call interface of the second SIM card in the second display region.

The call interface may include the calling number, the called number, the call duration and the like information of the SIM card in the call state.

In practice, the operation interface of the first SIM card is a call interface, and after the second operating system displays the incoming call interface of the second SIM card in the second display region, the method may further include:

when the second operating system receives a request for getting through the incoming call of the second SIM card, triggering an event to notify the first operating system to terminate or mute the call from the first SIM card, and getting through the incoming call of the second SIM card and displaying a call interface of the second SIM card in the second display region.

In this embodiment of the present invention, upon getting through the incoming call of the first SIM card, the first operating system may display the call interface of the first SIM card in the first display region. In this case, during the call process of the first SIM card, the user may selectively answer the incoming call of the second SIM card. In practice, the user may be provided with two selections. One is to maintain the call state of the first SIM card and answer the incoming call of the second SIM card; and the other is to terminate the call state of the first SIM card and answer the incoming call of the second SIM card. When receiving a request for notifying to get through the incoming call of the second SIM card, the second operating system may get through the incoming call of the second SIM card, and trigger an event to notify the first operating system to terminate or mute the call from the first SIM card.

After the incoming call of the second SIM card is got through, the call interface of the second SIM card may be displayed in the second display region. In practice, if the user maintains the call state of the first SIM card and answers the incoming call of the second SIM card, the display screen may display the call maintaining state of the first SIM card in the first display region, or may set the call state to mute. The specific implementation may be in accordance with the related art, and is thus not described any further in this embodiment of the present invention. If the user terminate the call state of the first SIM card and answers the incoming call of the second SIM card, the display screen may display information indicative hang-up of the incoming call of the first SIM card in the first display region, and display the call interface of the second SIM card in the second display region; or after the call of the first SIM card is terminated, the first display region is not displayed in the display screen, and the second display region is only displayed in the display screen.

In practice, after the second operating system displays the incoming call interface of the second SIM card in the second display region, the method may further include:

when any operating system determines that the incoming call of the SIM card corresponding to the operating system is not answered, displaying a missed call interface of the SIM card corresponding to the operating system in a display region corresponding to the operating system.

In this embodiment of the present invention, when it is determined that the incoming call of the first SIM card and/or the second SIM card is not answered, a missed call interface of the SIM card may be displayed in a corresponding display region. The practice may involve the following cases:

1) The user selects to reject the incoming calls from the first SIM card and the second SIM card.

The first operating system displays the missed call interface of the first SIM card in the first display region.

The second operating system displays the missed call interface of the second SIM card in the second display region.

2) The user selects to reject the incoming call of the first SIM card and answer the incoming call of the second SIM card; or the user selects to reject the incoming call of the second SIM card and answer the incoming call of the first SIM card.

The missed call interface of the first SIM card is displayed in the first display region, and the call interface of the second SIM card is displayed in the second display region; or the missed call interface of the second SIM card is displayed in the second display region, and the call interface of the first SIM card is displayed in the first display region.

3) The user selects to answer the incoming call of the first SIM card and ignore the incoming call of the second SIM card, and in this case, a period of time later, the incoming call of the second SIM card is automatically rejected; or the user selects to answer the incoming call of the second SIM card and ignore the incoming call of the first SIM card, and in this case, a period of time layer, the incoming call of the first SIM card is automatically rejected.

The call interface of the first SIM card is displayed in the first display region, and the missed call interface of the second SIM card is displayed in the second display region; or the call interface of the second SIM card is displayed in the second display region, and the missed call interface of the first SIM card is displayed in the first display region.

In this embodiment of the present invention, the display screen may be partitioned for display, and thus the incoming call messages of the two SIM cards may be displayed on the same display screen, which facilitates user's processing more incoming calls.

In practice, after the second operating system displays the incoming call interface of the second SIM card in the second display region, the method may further include:

when the call of any one SIM card of two SIM cards is terminated, recovering, by the first operating system, a display screen, or recovering, by an operating system corresponding to a SIM card of which the call is lastly terminated, a display screen; and displaying, by an operating system corresponding to the other SIM card, in full screen an operation interface of the other SIM card.

In this embodiment of the present invention, when the call from any of the two SIM card is terminated, the first operating system or the operating system corresponding to a SIM card of which the call is lastly terminated may cancel screen partitioning of the display screen and resume the partitioned screens into a full display screen, and the operating system corresponding to the other SIM card may display in full screen the operation interface of the SIM card in the display screen.

For example, when the call of the first SIM card is terminated, the first operating system may resume the display screen and trigger an event to notify the second operating system, and the second operating system may display the incoming call interface or the missed call interface of the second SIM card in the display screen.

For example, when the call of the second SIM card is terminated, the second operating system may resume the display screen and trigger an event to notify the first operating system, and the first operating system may resume the display screen and display the incoming call interface or the missed call interface of the first SIM card in the display screen.

For example, when the call of one SIM card is terminated, the operating system corresponding to this SIM card triggers an event to notify the operating system corresponding to the SIM card of which the call is not terminated; and the operating system corresponding to the SIM card of which the call is lastly terminated resumes the display screen, and displays the incoming call interface or the missed call interface of the SIM card in the display screen.

In this embodiment of the present invention, after the call of any of the two SIM cards is terminated, a jump is automatically made to the operating system corresponding to the other SIM card, and the current operation state of the other SIM card is displayed, such that the user is capable of timely processing the incoming call of the other SIM card upon processing the incoming call of one SIM card, thereby further improving user experience.

For ease of practice of the present invention, description is given hereinafter with reference to examples.

With respect to the dual-card and dual-system terminal in this embodiment of the present invention, the operating system may be divided into a personal operating system and an enterprise operating system (which may also be referred to as a secure operating system). For the sake of security, all the data in these two operating systems maintains independent in the physical aspect. That is, the address books, the incoming call messages, the short messages, the multimedia short messages, instant messages and the like are independent of one another. A user SIM card corresponds to an operating system, wherein a personal SIM card corresponds to the personal operating system and an enterprise SIM card corresponds to the enterprise operating system.

Three cases of processing the incoming call are described specifically hereinafter.

In the first case, the two SIM cards are both in an idle state, wherein one SIM card has an incoming call.

No matter in which operating system the terminal is maintained in a standby state, the terminal may receive incoming calls of the personal SIM card and the enterprise SIM card; and the terminal may be automatically switched to a corresponding operating system according to the type of the SIM card and display the incoming call message (for example, the calling number, the called number and the like).

Figure 2:
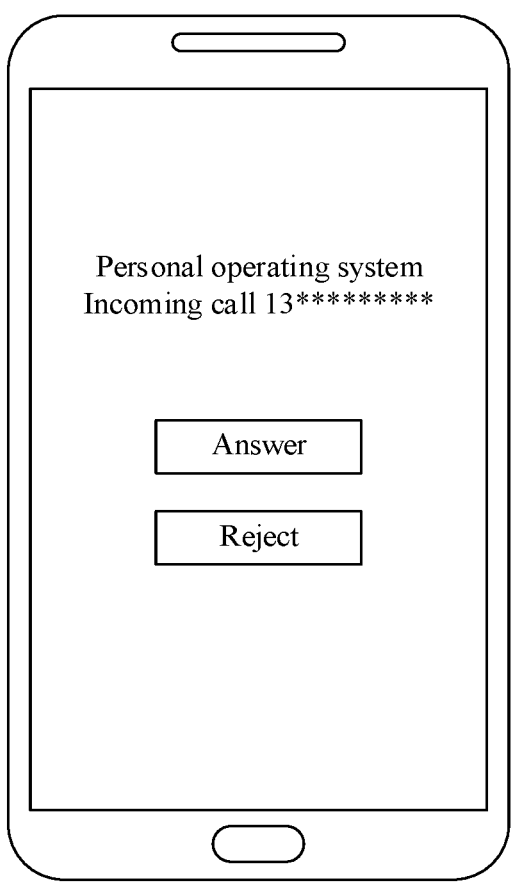
FIG. 2 is a schematic diagram illustrating that an incoming call message from only a personal SIM card is received according to an embodiment of the present invention.

FIG. 2 is a schematic diagram illustrating that an incoming call message from only a personal SIM card is received according to an embodiment of the present invention. As illustrated in FIG. 2, the personal operating system information, incoming call number information, answer key, reject key and the like may be displayed in the display screen of the terminal.

No matter whether the personal SIM card has an incoming call or the enterprise SIM card has an incoming call, the terminal may all allow the user to select to answer or reject the incoming call. If the user selects to answer the incoming call, the terminal may normally conduct the voice call; and if the user ignores or rejects the incoming call, the terminal displays missed call message including the calling number in the interface of the operating system corresponding to the SIM card. With respect to the missed call, the user may dial back the incoming call in the current operating system, and in this case, the terminal may be maintained in a standby state in the current operating system.

In this embodiment of the present invention, such operations as receiving, answering and rejecting the incoming call of each SIM card may be performed according to the communication technology of the mobile terminal in the related art. That is, each operating system may perform operations for a corresponding SIM card by using the operation manner of the operating system to the SIM card in the related art, which is not described any further in this embodiment of the present invention.

In the second case, the two SIM cards are both in an idle state, wherein both the two SIM cards have an incoming call.

No matter in which operating system the terminal is maintained in a standby state, since the two SIM cards are separately monitored by two operating systems, when the two SIM cards both have an incoming call, the terminal may simultaneously process the incoming calls of the personal SIM card and the enterprise SIM card, the incoming call messages of the two SIM cards may be displayed in the same screen, and each incoming call message may include the calling number and the corresponding called number. That is, if the personal SIM card and the enterprise SIM card simultaneously have an incoming call, in this embodiment of the present invention, the screen of the terminal may be partitioned for display. One portion displays the incoming call message of a personal operating system corresponding to the personal SIM card, and the other portion displays the incoming call message of an enterprise operating system corresponding to the enterprise SIM card.

Figure 3:
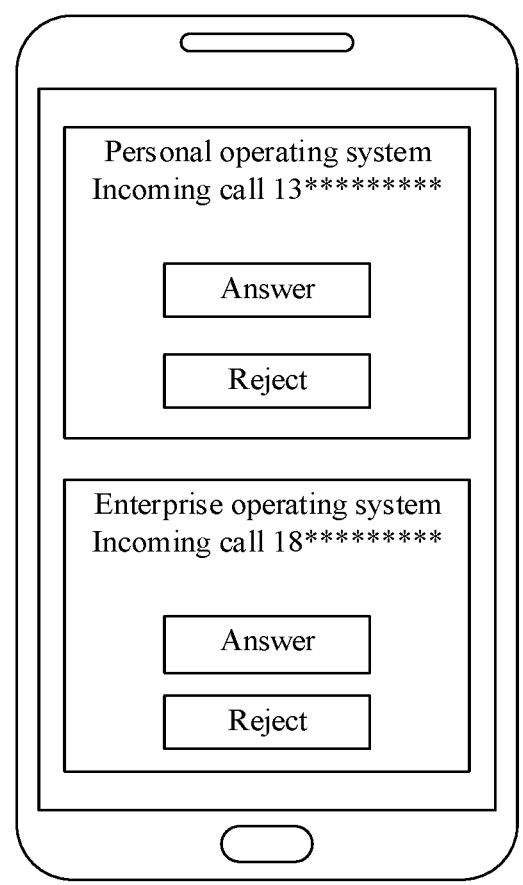
FIG. 3 is a schematic diagram illustrating that incoming calls from two SIM cards are received according to an embodiment of the present invention.

FIG. 3 is a schematic diagram illustrating that incoming calls from two SIM cards are received according to an embodiment of the present invention. As illustrated in FIG. 3, the screen of the terminal is partitioned into an upper display region and a lower display region. The upper display region may display the incoming call message of the personal SIM card, and the lower display region may display the incoming call message of the enterprise SIM card. The two display regions may both display the operating system information, the incoming call number information, the answer key, the reject key and the like.

The terminal may allow the user to selectively answer or reject the incoming call message of any one of the two SIM card. The terminal enters the corresponding operating system and carries out the call according to the type of the selected SIM card. With respect to the unselected SIM card, the terminal records the missed call message including the calling number in the operating system corresponding to the SIM card.

Figure 4:
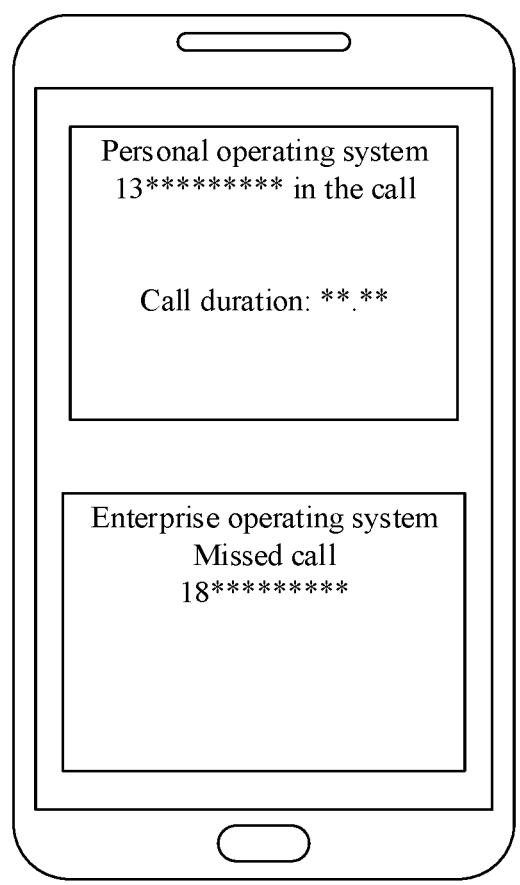
FIG. 4 is a schematic diagram illustrating that an incoming call of a personal SIM card is answered according to an embodiment of the present invention.

FIG. 4 is a schematic diagram illustrating that an incoming call of a personal SIM card is answered according to an embodiment of the present invention. As illustrated in FIG. 4, after the user selects the answer key in the upper display region, the incoming call of the personal SIM card is got through.

When the incoming call of the personal SIM card is got through, a period of time later, the incoming call of the enterprise SIM card is automatically rejected, or the user firstly rejects the incoming call of the enterprise SIM card before answering the incoming call of the personal SIM card. In this case, the display region where the incoming call is rejected may display the missed call interface. As illustrated in FIG. 4, the lower display region may display the missed call message of the enterprise SIM card, wherein the missed call message of the enterprise SIM card is provided by the enterprise operating system.

After the user terminates a call, the terminal may automatically return to the operating system corresponding to the unselected SIM card, and display the missed call message in the user interface, such that the user may directly dial back.

In the third case, when one SIM card is in the call, the other SIM card has an incoming call.

No matter which in which operating system the terminal is maintained in a standby state, when the user is in the call state in the operating system corresponding to one SIM card, if the other SIM card has an incoming call, the terminal may display the current call information and a second incoming call message (which may include the calling number and the corresponding my number) in the same screen. That is, when one SIM card is in the call and the other SIM card has an incoming call, in this embodiment of the present invention, the screen of the terminal may be partitioned for display. One portion displays communication information of the operating system corresponding to the SIM card in the call, and the other portion displays incoming call message of the operating system corresponding to the SIM card having an incoming call.

Figure 5:
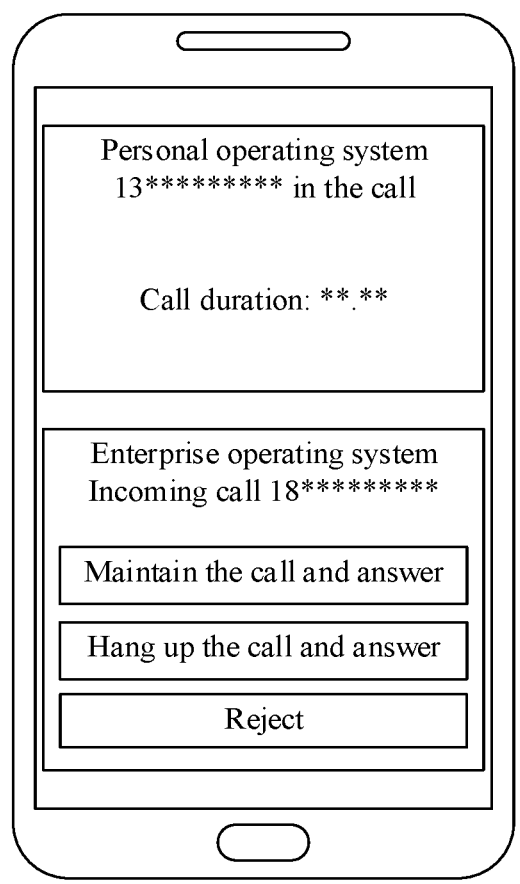
FIG. 5 is a schematic diagram of receiving an incoming call of an enterprise SIM card during a call of the personal SIM card according to an embodiment of the present invention.

FIG. 5 is a schematic diagram of receiving an incoming call of an enterprise SIM card during a call of the personal SIM card according to an embodiment of the present invention. As illustrated in FIG. 5, the display region (an upper part of the screen) of the personal SIM card may display the personal operating system information, the incoming call message, the state of being in the call, the call duration and the like; and the display region (the lower part of the screen) of the enterprise SIM card may display the enterprise operating system information, the incoming call message, the key of "maintaining the originally answered call", the key of "hanging up the original call", the reject key and the like.

The user may select to answer (maintaining the original call or hanging up the original call), reject or ignore the incoming call of the second SIM card. Hereinafter, description is given with reference to these processing manners.

When the user selects to hang up the incoming call of the first SIM card and answer the incoming call of the second SIM card, the terminal switches to the operating system corresponding to the second SIM card to get through the incoming call of the second SIM card, and hang up the call of the first SIM card.

When the user selects to maintain the call of the first SIM card and receive the incoming call of the second SIM card, the terminal displays the maintained call information (of the first SIM card) and the current call information (of the second SIM card) in the same screen interface. That is, when one SIM card is in the call and the other SIM card has an incoming call, the terminal may partition the screen thereof for display. One portion displays communication information of the operating system corresponding to the SIM card in the call, and the other portion displays incoming call message of the operating system corresponding to the SIM card of which the call is maintained.

When the user selects to reject the incoming call of the second SIM card, this rejection behavior is recorded in the operating system corresponding to the SIM card (the second SIM card) having an incoming call as a missed call. When the user hangs up the incoming call of the first SIM card, the terminal may return to the operating system corresponding to the SIM card of which the incoming call is rejected, and display the missed call message in the interface.

When the user selects to ignore the incoming call of the second SIM card, this ignoring behavior is recorded in the operating system corresponding to the SIM card having an incoming call as a missed call. When the user hangs up the incoming call of the first SIM card, the terminal may return to the operating system corresponding to the SIM card of which the incoming call is rejected, and display the missed call message in the interface.

In the technical solution according to this embodiment of the present invention, when only one SIM card has an incoming call, the terminal may enter the corresponding operating system to process the incoming call according to the number called by the calling party; when the two SIM cards both have an incoming call, the terminal may display the call information of the two SIM cards in two display regions of the screen; and when the two SIM cards both have an incoming call and the incoming call of one SIM card is rejected, upon termination of the call, the terminal may automatically enter the operating system corresponding to the SIM card of which the incoming call is rejected, and display information of the missed or rejected call.

Since the information of the missed calls of the personal SIM card and the enterprise SIM card is stored in their respective operating system, if the user rejects the incoming call of the personal SIM card and rejects the incoming call of the enterprise SIM card, or if the user ignores the incoming calls of both the personal SIM card and the enterprise SIM card, a period of time later, the incoming calls of the two SIM cards are both defaulted as being not answered. In this case, the missed call interfaces may be respectively displayed in the personal SIM card display region and the enterprise SIM card display region.

Figure 6:
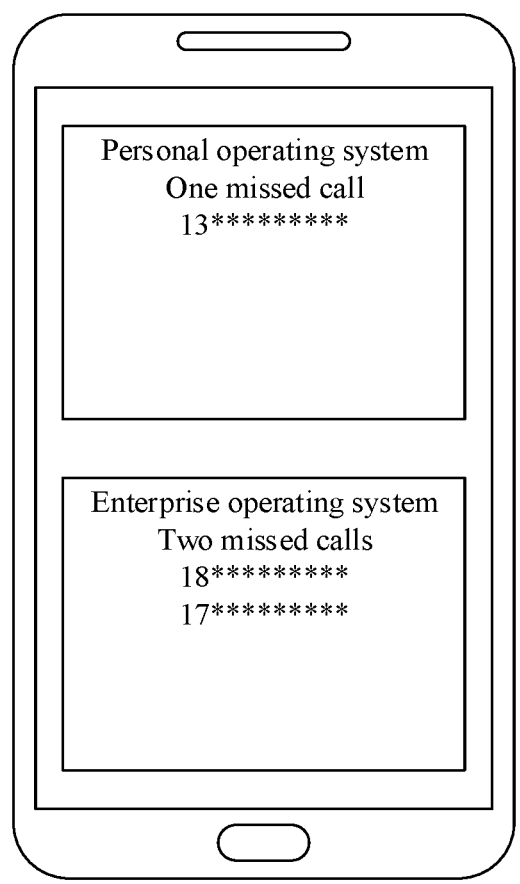
FIG. 6 is a schematic diagram illustrating that incoming calls from two SIM cards are neither answered according to an embodiment of the present invention.

FIG. 6 is a schematic diagram illustrating that incoming calls from two SIM cards are neither answered according to an embodiment of the present invention. As illustrated in FIG. 6, in this embodiment of the present invention, the terminal may display the missed call information of the personal SIM card and the enterprise SIM card in the same screen, and clearly note the information of the operating systems corresponding to the personal SIM card and the enterprise SIM card and may also display the number of missed calls. That is, if there are more missed calls and the missed calls include incoming calls of the personal SIM card and incoming calls of the enterprise SIM card, the screen of the terminal may be partitioned for display. One portion displays personal operating system corresponding to the personal SIM card, and the other portion displays enterprise operating system information corresponding to the enterprise SIM card.

Embodiment 2

Based on the same inventive concept, this embodiment of the present invention further provides an incoming call processing apparatus for a dual-card and dual-system terminal. Since the apparatus is intended to solve the technical problem based on the same principle as the incoming call processing method for a dual-card and dual-system terminal, the apparatus embodiment may be referenced to the method embodiment, and the repeated portions are not further given herein.

Figure 7:
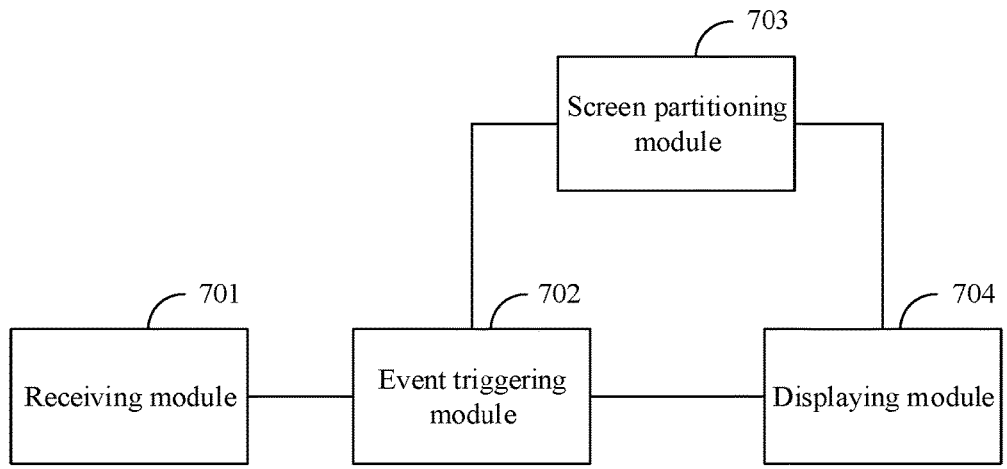
FIG. 7 is a schematic structural diagram of an incoming call processing apparatus for a dual-card and dual-system terminal according to Embodiment 2 of the present invention.

FIG. 7 is a schematic structural diagram of an incoming call processing apparatus for a dual-card and dual-system terminal according to Embodiment 2 of the present invention. As illustrated in FIG. 7, the incoming call processing apparatus for a dual-card and dual-system terminal may include:

a receiving module 701, configured to receive, in a first operating system, an incoming call of a first user identity module (SIM) card, and receive, in a second operating system, an incoming call of a second SIM card;

an event triggering module 702, configured to trigger, in the second operating system, an event to notify the first operating system of the incoming call of the second SIM card;

a screen partitioning module 703, configured to partition, in the first operating system, a display screen into a first display region and a second display region according to a predetermined display manner; and a displaying module 704, configured to display, in the first operating system, an operation interface of the first SIM card in the first display region;

wherein the event triggering module 702 is further configured to trigger an event to notify the second operating system of display in the second display region; and the displaying module 704 is further configured to display, in the second operating system, an incoming call interface of the second SIM card in the second display region.

In practice, the apparatus may further include:

an incoming call processing module, configured to, when any operating system receives a request for getting through the incoming call of the SIM card corresponding to the operating system, get through the incoming call of the SIM card corresponding to the operating system;

wherein the displaying module may be further configured to display a call interface of the SIM card corresponding to the operating system in a display region of the operating system.

In practice, the operation interface of the first SIM card is a call interface; the receiving module may be further configured to, when the second operating system receives a request for getting through the incoming call of the second SIM card, trigger an event to notify the first operating system to terminate or mute the call from the first SIM card; the incoming call processing module may be further configured to get through the incoming call of the second SIM card; and the displaying module may be further configured to display, in the second operating system, a call interface of the second SIM card in the second display region.

In practice, the apparatus may further include:

a determining module, configured to determine, in any operating system, that the incoming call of the SIM card corresponding to the operating system is not answered; and/or determine, in the second operating system, that the incoming call of the second SIM card is not answered;

wherein the displaying module may be further configured to display a missed call interface of the SIM card corresponding to the operating system in a display region of the operating system.

In practice, the apparatus may further include:

a resuming module, configured to, when the call of any one SIM card of two SIM cards is terminated, resume, in the first operating system, a display screen; and the displaying module may be further configured to display, in an operating system corresponding to the other SIM card, in full screen an operation interface of the other SIM card.

Embodiment 3

Based on the same inventive concept, this embodiment of the present invention further provides a storage medium, wherein the storage medium stores instructions configured to perform the method as illustrated in Embodiment 1.

Embodiment 4

Based on the same inventive concept, this embodiment of the present invention further provides a dual-card and dual-system terminal, including a processor and the storage medium as illustrated in Embodiment 3, wherein the processor is configured to execute the instructions stored in the storage medium.

Embodiment 5

Figure 8:
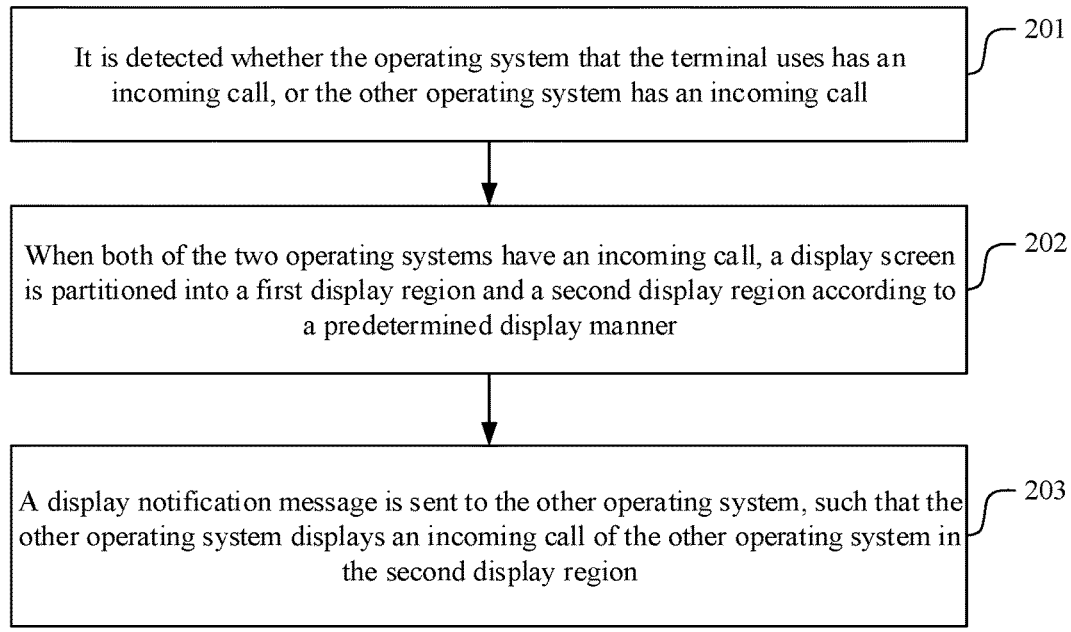
FIG. 8 is a schematic flowchart of an incoming call processing method according to Embodiment 5 of the present invention.

Based on the same inventive concept, this embodiment of the present invention further provides an incoming call processing method for a dual-card and dual-system terminal. As illustrated in FIG. 8, the method includes the following steps.

Step 201: It is detected whether the operating system that the terminal uses has an incoming call, or the other operating system has an incoming call.

The detecting whether the other operating system has an incoming call includes: determining that the other operating system has an incoming call when an incoming call notification message sent by the other operating system is received.

Step 202: When both of the two operating systems have an incoming call, a display screen is partitioned into a first display region and a second display region according to a predetermined display manner.

Step 203: A display notification message is sent to the other operating system, such that the other operating system displays an incoming call of the other operating system in the second display region.

Further, the method further includes: upon receiving an incoming call request from a SIM card corresponding to the operating system that the terminal uses, getting through an incoming call of the SIM card corresponding to the operating system that the terminal uses, and displaying a call interface of the SIM card in a display region corresponding to the operating system.

Further, the method further includes: when the operating system that the terminal uses receives an incoming call request from a corresponding SIM card, notifying termination or muting of a call of the SIM card of the other operating system.

Further, the method further includes: detecting whether an incoming call of a SIM card corresponding to the operating system that the terminal uses is answered, and when it is detected that the incoming call is not answered, displaying, in a first display region, a missed call interface of the SIM card corresponding to the operating system that the terminal uses.

Further, the method further includes, when a call termination notification sent by the other operating system is received and the call of the operating system that the terminal uses is continued, displaying in full screen a call of the operating system that the terminal uses.

Embodiment 6

Figure 9:
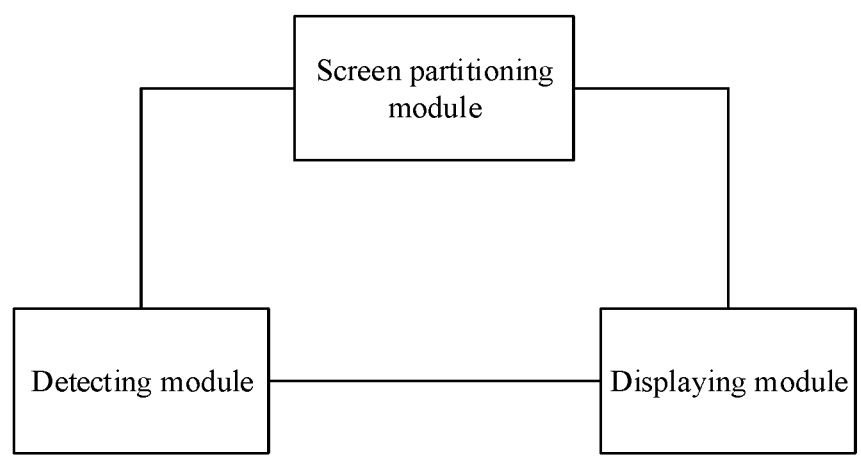
FIG. 9 is a schematic structural diagram of an incoming call processing apparatus for a dual-card and dual-system terminal according to Embodiment 6 of the present invention.

Based on the same inventive concept, this embodiment of the present invention further provides an incoming call processing apparatus. As illustrated in FIG. 9, the apparatus includes: a detecting module, a screen partitioning module and a displaying module.

The detecting module is configured to detect whether one operating system that the terminal uses has an incoming call or the other operating system has an incoming call; wherein the detecting whether the other operating system has an incoming call includes: determining that the other operating system has an incoming call when an incoming call notification message sent by the other operating system is received.

The screen partitioning module is configured to, when both of the two operating systems have an incoming call, partition a display screen into a first display region and a second display region according to a predetermined display manner, and send a display notification message to the other operating system, such that the other operating system displays an incoming call of the other operating system in the second display region.

The displaying module is configured to display, in the first display region, the incoming call of the operating system that the terminal uses.

Further, the apparatus further includes an incoming call processing module, configured to, upon receiving an incoming call request from a SIM card corresponding to the operating system that the terminal uses, get through an incoming call of the SIM card corresponding to the operating system that the terminal uses, and display a call interface of the SIM card in a display region corresponding to the operating system.

Further, when the operating system that the terminal uses receives an incoming call request from a corresponding SIM card, the notifying module is configured to notify termination or muting of a call of the SIM card of the other operating system.

Further, the detecting module is further configured to detect whether the incoming call of the SIM card corresponding to the operating system that the terminal uses is answered, and notify the displaying module that the incoming call is not answered if it is detected that the incoming call is not answered; and The displaying module is further configured to, upon receiving the notification that the incoming call is not answered, display a missed call interface of the SIM card corresponding to the SIM card that the terminal uses.

Further, the notifying module is further configured to, when a call termination notification sent by the other operating system is received and the call of the operating system that the terminal uses is continued, display in full screen a call of the operating system that the terminal uses.

Embodiment 7

Based on the same inventive concept, this embodiment of the present invention further provides a storage medium, wherein the storage medium stores instructions configured to perform the method as illustrated in Embodiment 5.

Embodiment 8

Based on the same inventive concept, this embodiment of the present invention further provides a dual-card and dual-system terminal, including a processor and the storage medium as illustrated in Embodiment 7, wherein the processor is configured to execute the instructions stored in the storage medium.

For ease of description, in the description, various parts of the above apparatuses are divided into various modules or units according to function for separate description. Nevertheless, the function of each module or unit is implemented in the same or a plurality of software and/hardware when the present invention is practiced.

Those skilled in the art shall understand that the embodiments may be described as illustrating methods, systems, or computer program products. Therefore, hardware embodiments, software embodiments, or hardware-plus-software embodiments may be used to illustrate the present invention. In addition, the present invention may further employ a computer program product which may be implemented by at least one non-transitory computer-readable storage medium with an executable program code stored thereon. The non-transitory computer-readable storage medium includes, but not limited to, a disk memory, a CD-ROM, and an optical memory.

The present invention is described based on the flowcharts and/or block diagrams of the method, device (system), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product including an instruction apparatus, wherein the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although preferred embodiments of the present invention are described, those skilled in the art may make modifications and variations to these embodiments based on the basic inventive concept of the present invention. Therefore, the preferred embodiments and all such modifications and variations shall fall within the protection scope subject to the appended claims.

The invention claimed is:

1. An incoming call processing method for a dual-card and dual-system terminal, comprising the following steps:
    receiving, by a first operating system, an incoming call of a first subscriber identity module (SIM) card;
    triggering, by a second operating system receiving an incoming call of a second SIM card, an event to notify the first operating system of the incoming call of the second SIM card;
    partitioning, by the first operating system, a display screen into a first display region and a second display region according to a predetermined display manner, displaying an operating interface of the SIM card corresponding to the first operating system in the first display region, and triggering an event to notify the second operating system of display in the second display region; wherein the second operating system displays an incoming call interface of the second SIM card in the second display region; or
    partitioning, by the second operating system, a display screen into a first display region and a second display region according to a predetermined display manner, displaying an operating interface of the SIM card corresponding to the second operating system in the second display region, and triggering an event to notify the first operating system of display in the first display region; wherein the first operating system displays an incoming call interface of the first SIM card in the first display region;
    wherein the operating interface of the first SIM card is an incoming call interface, and after the second operating system displays the incoming call interface of the second SIM card in the second display region, the method further comprises:
    when any operating system receives a request for getting through the incoming call of the SIM card corresponding to the operating system, getting through the incoming call of the SIM card corresponding to the operating system, and displaying a call interface of the SIM card corresponding to the operating system in a display region of the operating system.

2. The method according to claim 1, wherein the operating interface of the first SIM card is a call interface, and after the second operating system displays the incoming call interface of the second SIM card in the second display region, the method further comprises:
    when the second operating system receives a request for getting through the incoming call of the second SIM card, triggering an event to notify the first operating system to terminate or mute the call from the first SIM card, and getting through the incoming call of the second SIM card and displaying a call interface of the second SIM card in the second display region.

3. The method according to claim 1, wherein after the second operating system displays the incoming call interface of the second SIM card in the second display region, the method further comprises:
    when any operating system determines that the incoming call of the SIM card corresponding to the operating system is not answered, displaying a missed call interface of the SIM card corresponding to the operating system in a display region corresponding to the operating system.

4. The method according to claim 1, wherein after the second operating system displays the incoming call interface of the second SIM card in the second display region, the method further comprises:
    when the call of any one SIM card of two SIM cards is terminated, resuming, by the first operating system, a display screen, or resuming, by an operating system corresponding to a SIM card of which the call is lastly terminated, a display screen; and displaying, by an operating system corresponding to the other SIM card, in full screen an operation interface of the other SIM card.

5. An incoming call processing method for a dual-card and dual-system terminal, comprising:
   detecting whether one operating system that the terminal uses has an incoming call or the other operating system has an incoming call; wherein the detecting whether the other operating system has an incoming call comprises: determining that the other operating system has an incoming call when an incoming call notification message sent by the other operating system is received;
   when both of the two operating systems have an incoming call, partitioning a display screen into a first display region and a second display region according to a predetermined display manner, displaying, in the first display region, the incoming call of the operating system that the terminal uses, and sending a display notification message to the other operating system, such that the other operating system displays an incoming call of the other operating system in the second display region; and
   upon receiving an incoming call request from a SIM card corresponding to the operating system that the terminal uses, getting through an incoming call of the SIM card corresponding to the operating system that the terminal uses, and displaying a call interface of the SIM card in a display region corresponding to the operating system.

6. The method according to claim 5, further comprising:
   when the operating system that the terminal uses receives an incoming call request from a corresponding SIM card, notifying termination or muting of a call of the SIM card of the other operating system.

7. The method according to claim 5, further comprising:
   detecting whether an incoming call of a SIM card corresponding to the operating system that the terminal uses is answered, and when it is detected that the incoming call is not answered, displaying, in a first display region, a missed call interface of the SIM card corresponding to the operating system that the terminal uses.

8. The method according to claim 5, further comprising:
   when a call termination notification sent by the other operating system is received and the call of the operating system that the terminal uses is continued, displaying in full screen a call of the operating system that the terminal uses.

9. A non-transitory storage medium, storing instructions configured to perform an incoming call processing method, the method comprising:
   detecting whether one operating system that the terminal uses has an incoming call or the other operating system has an incoming call; wherein the detecting whether the other operating system has an incoming call comprises: determining that the other operating system has an incoming call when an incoming call notification message sent by the other operating system is received;
   when both of the two operating systems have an incoming call, partitioning a display screen into a first display region and a second display region according to a predetermined display manner, displaying, in the first display region, the incoming call of the operating system that the terminal uses, and sending a display notification message to the other operating system, such that the other operating system displays an incoming call of the other operating system in the second display region; and
   upon receiving an incoming call request from a SIM card corresponding to the operating system that the terminal uses, getting through an incoming call of the SIM card corresponding to the operating system that the terminal uses, and displaying a call interface of the SIM card in a display region corresponding to the operating system.

10. A dual-card and dual-system terminal, comprising:
    a storage medium storing instructions; and
    a processor, configured to execute the instructions stored in the storage medium,
    wherein the instructions are configured to perform an incoming call processing method, the method comprising:
    detecting whether one operating system that the terminal uses has an incoming call or the other operating system has an incoming call; wherein the detecting whether the other operating system has an incoming call comprises: determining that the other operating system has an incoming call when an incoming call notification message sent by the other operating system is received;
    when both of the two operating systems have an incoming call, partitioning a display screen into a first display region and a second display region according to a predetermined display manner, displaying, in the first display region, the incoming call of the operating system that the terminal uses, and sending a display notification message to the other operating system, such that the other operating system displays an incoming call of the other operating system in the second display region; and
    upon receiving an incoming call request from a SIM card corresponding to the operating system that the terminal uses, getting through an incoming call of the SIM card corresponding to the operating system that the terminal uses, and displaying a call interface of the SIM card in a display region corresponding to the operating system.

11. The non-transitory storage medium according to claim 9, wherein the method further comprises:
    when the operating system that the terminal uses receives an incoming call request from a corresponding SIM card, notifying termination or muting of a call of the SIM card of the other operating system.

12. The non-transitory storage medium according to claim 9, wherein the method further comprises:
    detecting whether an incoming call of a SIM card corresponding to the operating system that the terminal uses is answered, and when it is detected that the incoming call is not answered, displaying, in a first display region, a missed call interface of the SIM card corresponding to the operating system that the terminal uses.

13. The non-transitory storage medium according to claim 9, wherein the method further comprises:
    when a call termination notification sent by the other operating system is received and the call of the operating system that the terminal uses is continued, displaying in full screen a call of the operating system that the terminal uses.

14. The dual-card and dual-system terminal according to claim 10, wherein the method further comprises:
    upon receiving an incoming call request from a SIM card corresponding to the operating system that the terminal uses, getting through an incoming call of the SIM card corresponding to the operating system that the terminal uses, and displaying a call interface of the SIM card in a display region corresponding to the operating system.

15. The dual-card and dual-system terminal according to claim 10, wherein the method further comprises:

when the operating system that the terminal uses receives an incoming call request from a corresponding SIM card, notifying termination or muting of a call of the SIM card of the other operating system.

16. The dual-card and dual-system terminal according to claim 10, wherein the method further comprises:
detecting whether an incoming call of a SIM card corresponding to the operating system that the terminal uses is answered, and when it is detected that the incoming call is not answered, displaying, in a first display region, a missed call interface of the SIM card corresponding to the operating system that the terminal uses.

17. The dual-card and dual-system terminal according to claim 10, wherein the method further comprises:
when a call termination notification sent by the other operating system is received and the call of the operating system that the terminal uses is continued, displaying in full screen a call of the operating system that the terminal uses.

* * * * *